(12) United States Patent
Krauss

(10) Patent No.: US 6,575,652 B2
(45) Date of Patent: Jun. 10, 2003

(54) STRUCTURAL COUPLINGS AND SYSTEM

(76) Inventor: Kurt F. Krauss, 3220 Deer Creek Rd., Selma, OR (US) 97538

(*) Notice: Subject to any disclaimer, the term of this patent is extended or adjusted under 35 U.S.C. 154(b) by 0 days.

(21) Appl. No.: 09/761,537

(22) Filed: Jan. 16, 2001

(65) Prior Publication Data

US 2002/0094228 A1 Jul. 18, 2002

(51) Int. Cl.[7] .................................................. E04G 7/00
(52) U.S. Cl. .................. 403/49; 403/175; 403/230; 403/241; 403/396; 248/230.5; 248/229.24
(58) Field of Search ........................... 403/49, 175, 230, 403/241, 396, 335, 336; 248/218.4, 229.24, 227.3, 230.5; 256/65.01, 67, 68

(56) References Cited

U.S. PATENT DOCUMENTS

| | | |
|---|---|---|
| 539,249 A | 5/1895 | Clamer |
| 555,512 A | 3/1896 | Johnson |
| 582,170 A | 5/1897 | Brown |
| 1,344,342 A | 6/1920 | Hansen |
| 1,547,214 A | 7/1925 | Gooding |
| 2,676,025 A | 4/1954 | Davis |
| 2,850,311 A | 9/1958 | Mansfield |
| 3,092,407 A | 6/1963 | Blonder |
| 3,428,300 A | 2/1969 | Sconzo |
| 3,524,627 A | 8/1970 | Boyanton et al. |
| 4,619,545 A | 10/1986 | Kuttenbaum |
| 4,632,221 A | 12/1986 | Stanford |
| 4,834,431 A | 5/1989 | Calmettes et al. |
| 4,840,513 A | 6/1989 | Hackett |
| 4,864,795 A | 9/1989 | Burg |
| 4,880,195 A | 11/1989 | Lepley |
| 4,896,454 A | 1/1990 | Cronenwett et al. |
| 4,915,535 A | 4/1990 | Willetts |
| 5,098,051 A | 3/1992 | Aldridge et al. |
| 5,184,911 A | 2/1993 | Wu |
| 5,193,774 A | 3/1993 | Rogers |
| 5,217,314 A * | 6/1993 | Perruelle ...................... 403/49 |
| 5,531,536 A | 7/1996 | Blanchfield et al. |
| 5,575,580 A | 11/1996 | Parrish et al. |
| 5,785,447 A | 7/1998 | Fonti et al. |
| 5,961,240 A * | 10/1999 | Bobrovniczky .............. 403/49 |

* cited by examiner

Primary Examiner—Lynne H. Browne
Assistant Examiner—John R. Cottingham
(74) Attorney, Agent, or Firm—Keith A. Cushing

(57) ABSTRACT

An annular collar-clamp attaches to a vertical post at selected height and radial orientation and includes an annular pattern of upper and lower dovetail mount sites receiving a bifurcated component mounting assembly having a corresponding inter-fitting pattern of semi-annular dovetail mounts whereby the mounting assembly engages the collar-clamp at a selected discrete position thereon. By use of discontinuous or non-concentric surface engagement in such orientation and pattern to lock together the collar-clamp and the associated mounting component assembly, better load distribution and overall strength results while retaining an ability to position a component at any selected radial orientation relative to the post.

20 Claims, 9 Drawing Sheets

STRUCTURAL COUPLINGS AND SYSTEM

BACKGROUND OF THE INVENTION

The present invention relates generally to coupling of structural components to form an overall structure and system. More particularly, the present invention relates to clamping arrangements coupling together structural components to form, for example, playground structures.

A playground structure depends from a set of vertically disposed frame components, e.g., five-inch diameter steel or aluminum-alloy posts, secured by ground-footings in vertical orientation and at selected positions according to a planned structure layout. Additional structural components then mount to and between such vertical posts to complete the playground structure plan. The subject matter of the present invention allows attachment of such additional playground structural components each at selected vertical position and radial orientation relative to such vertical posts.

U.S. Pat. No. 5,785,447 issued Jul. 28, 1998 to Fonti et al entitled "Connector For Structural Apparatus" shows a connector including a pair of hemi-annular clamps joined together at abutting ends thereof to capture therebetween a vertical post. The resulting annular clamp presents upper and lower annular ridge formations in offset concentric relation to the post. A component-mounting element slidably positionable about the annular clamp structure engages the upper and lower ridge formations and supports a component extending radially outward therefrom. In one embodiment, the component mounting element is bifurcated into upper and lower parts engaging the upper and lower annular ridges from above and below, respectively.

U.S. Pat. No. 5,575,580 issued Nov. 19, 1996 to Parish et al and entitled "Connector For Structural Apparatus" shows a disclosure similar to that of U.S. Pat. No. 5,785,447 as discussed above.

Unfortunately, the slidable relationship between the component-mounting element and the annular clamp, while establishing non-discrete or analog positioning of the component-mounting element relative to the annular clamp, minimizes the contact surface area of the interface therebetween. This maximizes the component load force per surface area by focusing load forces on the minimal contact area.

As may be appreciated, components in a playground structure must mount securely without risk of loosening or of detachment and resulting structural weakness or failure. The stronger and more reliable the coupling between the vertical posts and components attached thereto the better the overall playground structure. Furthermore, due to the modular design approach taken in most playground structure plans, such clamping arrangements should possess an ability to support versatile clamping patterns including variation in vertical height as well as radial orientation relative to the vertical posts. Finally, to minimize manufacturing costs, such clamping arrangements should provide the greatest degree of versatility with the least number of clamping device types.

The subject matter of the present invention provides such a clamping arrangement particularly well-suited for playground structures and particularly versatile in clamping arrangements as to height and radial orientation as well as broad variety in the type of components attachable in secure fashion to the vertical posts of a playground structure.

SUMMARY OF THE INVENTION

Generally, the present invention departs from the minimal surface contact area as provided by the circular, i.e., concentric to the post, contact surface engagement geometry of the prior art by use of discontinuous or non-concentric contact surface engagement in such orientation and pattern to lock together upon engagement the collar-clamp and the associated mounting component assembly.

As in prior art systems, structural components depend from cylindrical posts and annular clamps concentric to and engaging the posts at a selected position therealong and at selected radial orientation thereabout carry thereon component-coupling members. The annular clamps under the present invention, however, include a first contact surface non-concentric relative to the post but following an annular path concentric to post. As in the prior art, the component-coupling member attaches to and supports the component. The component-coupling member under the present invention, however, includes a second contact surface matingly compatible to inter-fit the first contact surface. The second contact surface engages the first contact surface to transfer from the second contact surface to the first contact surface a load force originating from the component.

The subject matter of the present invention is particularly pointed out and distinctly claimed in the concluding portion of this specification. However, both the organization and method of operation of the invention, together with further advantages and objects thereof, may be understood best by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
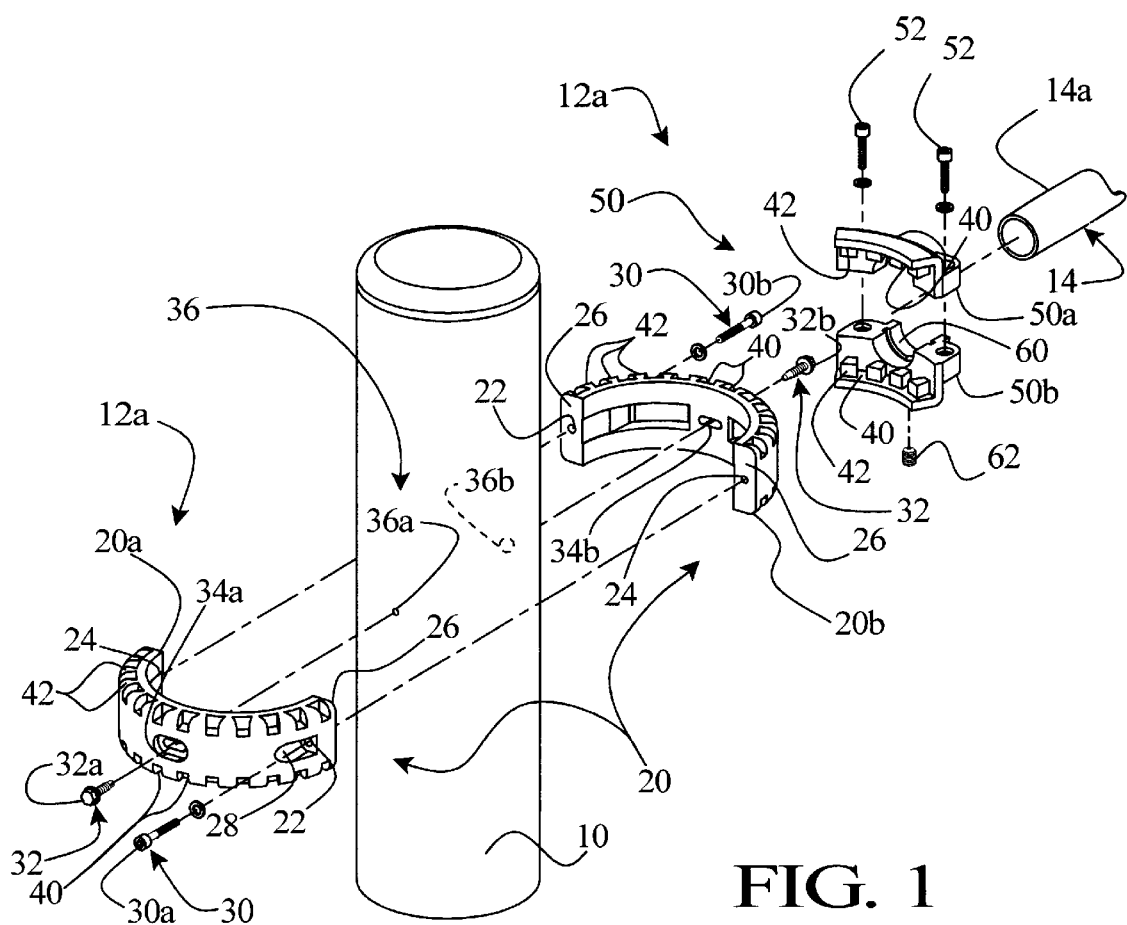
FIG. 1 illustrates, in perspective assembly view, a collar-clamp and socket assembly according to a preferred embodiment of the present invention for securing a playground structural component to a vertical post

FIG. 1 illustrates, in perspective assembly view, a collar-clamp and socket assembly 12a according to a preferred embodiment of the present invention. In FIG. 1, a post 10, e.g., a five-inch diameter steel or aluminum-alloy cylindrical element, mounts in vertical orientation relative to surrounding surface or ground terrain (not shown). A plurality of such posts 10 in a given, i.e., planned, configuration establish a base or frame structure for an overall playground structure completed by coupling additional structural components to and between such posts 10. Collar-clamp and socket assembly 12a is a first example illustrated herein for attaching such components to posts 10 in accordance with the present invention.

In FIG. 1, collar-clamp and socket assembly 12a couples to a post 10 and supports a component 14 (only partially illustrated in FIG. 1). In the particular illustration of FIG. 1, component 14 includes a protruding elongate cylindrical structure 14a (shown in FIG. 1) attachable to collar-clamp and socket assembly 12a. Component 14 as a whole, however, represents a variety of components used in constructing playground structures. Thus, component 14 may take a variety of overall forms each including a cylindrical portion 14a thereof as illustrated in FIG. 1 and attachable to collar-clamp and socket assembly 12a. As may be appreciated, component 14 spans a pair of posts 10 and enjoys secure attachment therebetween by virtue of a collar-clamp and socket assembly 12a at each end (portion 14a) thereof.

Each collar-clamp and socket assembly 12a includes at least one annular collar 20 comprising a first hemi-annular (C-shaped) collar half 20a and a second hemi-annular (C-shaped) collar half 20b. Collar half 20a and collar half 20b join in abutment at each end face 26 to form annular clamp 20 surrounding a given post 10. Each of collar halves 20a and 20b are identical in structure with one rotated in orientation relative to the other when joined. Each collar half 20a and 20b includes an open aperture 22 and a threaded aperture 24. Each of apertures 22 and 24 lie generally tangentially relative to the curvature of collar halves 20a and 20b. Each of apertures 22 and 24 open at one of the collar end faces 26, i.e., a generally flat surface abutting the opposing collar half. Apertures 22 include a recess 28 in the collar half exterior surface at the end opposite relative to end face 26.

Collar half 20a and collar half 20b join together by aligning open aperture 22 of collar half 20a with threaded aperture 24 of collar half 20b and, similarly, by aligning open aperture 22 of collar half 20b with threaded aperture 24 of collar half 20a. Bringing together collar half 20a and collar half 20b in this manner captures therebetween post 10. Collar bolts 30, individually bolt 30a and bolt 30b, secure together collar half 20a and collar half 20b. More particularly, bolt 30a passes through recess 28 of collar half 20a, open aperture 22 of collar half 20a and threadably engages threaded aperture 24 of collar half 20b. The head of bolt 30a thereby lies below the exterior surface contour of collar half 20a within recess 28 thereof. Similarly, collar bolt 30b passes through recess 28 of collar half 20b, open aperture 22 of collar half 20b and threadably engages threaded aperture 24 of collar half 20a. The head of bolt 30b thereby lies below the exterior surface contour of collar half 20b within recess 28 thereof. When bolts 30a and 30b fully tighten, collar halves 20a and 20b come together and tightly engage post 10 within the resulting annular collar 20.

Self-tapping screws 32, individually screw 32a and screw 32b, further secure collar 20 upon post 10. More particularly, self-tapping screw 32a passes through slotted aperture 34a of collar half 20a and bores into post 10 to form the aperture 36a. Similarly, self-tapping screw 32b passes through slotted aperture 34b of collar half 20b and bores into post 10 to form the aperture 36b. In the illustrated embodiment, aperture 34a and aperture 34b are each slotted apertures providing a given degree of lateral, i.e., rotational-horizontal, movement of collar 20 subsequent to insertion of screws 32 through the corresponding slotted aperture 34 and into the corresponding apertures 36 in post 10. Each of slotted apertures 34 also includes a counter-sunk recess to accommodate the head of the corresponding screw 32 below the exterior surface contour of the corresponding collar half.

Collar 20 securely mounts to post 10 at a selected elevation and rotational position by first joining together collar half 20a and collar half 20b to capture therebetween post 10. Partial engagement of bolts 30 relative to collar 20 leaves the resulting annular structure free for vertical and radial positioning relative to post 10. Once collar 20 achieves the desired vertical position, self-tapping screws 32 insert through the corresponding apertures 34 and establish the corresponding apertures 36. This sets the vertical position for collar 20. Collar 20 retains, however, due to the slotted configuration of apertures 34, some degree of rotational freedom relative to post 10 to establish final radial orientation relative to post 10. Once collar 20 reaches its desired radial orientation relative to post 10, collar bolts 30 and screws 32 fully tighten to tightly secure collar 20 upon post 10 at selected vertical height and radial orientation relative to post 10.

Collar 20 presents an annular pattern of upper and lower cogs or dovetails, i.e., a series of alternating trapezoidal cutouts 40 and trapezoidal teeth 42 about the upper and lower peripheries of collar 20.

A component socket 50 includes a corresponding series of cutouts 40 and teeth 42. In other words, the trapezoidal cutouts 40 and teeth 42 of collar 20 are complimentary and inter-fitting relative to the corresponding teeth 42 and cutouts 40 of socket 50. Thus, teeth 42 of socket 50 fit within cutouts 40 of collar 20 and teeth 42 of collar 20 fit within cutouts 40 of socket 50. Teeth 42 and cutouts 40 of socket 50 lie along a semi-annular path corresponding in radius to that of the circular pattern presented by collar 20. In this manner, and as described more fully hereafter, socket 50 engages the dovetail pattern of teeth 42 and cutouts 40 of collar 20 to secure socket assembly 50 thereon at a selected discrete position relative to collar 20.

Socket 50 includes an upper socket 50a and a lower socket 50b. By positioning upper socket 50a relative to the upper dovetail pattern on collar 20 and moving it vertically downward to engage collar 20 thereat, upper socket 50a mounts at a given discrete position on collar 20. Similarly, with lower socket 50b positioned directly below upper socket 50a and moved vertically upward, lower socket 50b engages cutouts 40 and teeth 42 at the corresponding teeth 42 and cut-outs 40, respectively, along the lower periphery of collar 20.

Thus, the contact surface area between socket 50 and clamp 20 is increased relative to prior art "concentric" or "slidable-type" mounting arrangements. This inter-fitting and matingly compatible relationship locks together clamp 20 and socket 50 against component 14 load forces while concurrently increasing the overall surface area of each relative to continuous, e.g., circular and concentric to the post, contact surface geometries of the prior art. In the particular embodiment illustrated, a pattern of planar surfaces establish a discontinuous contact surface non-concentric to the post 10, but following an annular or concentric path relative to post 10.

A series of curvilinear surfaces could be used as well to establish a discontinuous contact surface arrangement following an annular path about post 10 so long as the geometry thereof locks together the annular clamp and socket 50 and resists load forces, both parallel and non-parallel to the axis of post 10. Other contact surface schemes contemplated under the present invention include an alternating pattern of daggers, e.g., vertically disposed planar or curvilinear projects, and wells, i.e., depressions matingly compatible with the daggers, on the clamp and socket to lock together the clamp and socket against load forces originating from the component supported thereby. A similar "gear" relationship is contemplated under the present invention having horizontally disposed daggers and wells. As will be appreciated, a variety of contact surface geometries will also provide the necessary resistance to component load forces to lock together the clamp and socket as contemplated under the present invention.

Socket 50 thereby finds secure attachment at a given discrete location relative to collar 20. Socket bolts 52 secure together upper socket 50a and lower socket 50b and thereby secure socket assembly 50 at its selected discrete location upon collar 20. As joined together, upper socket 50a and lower socket 50b form a cylindrical and outwardly directed component mount aperture 60 corresponding in diameter to the selected component 14 cylindrical portion 14a mountable therein. As may be appreciated, aperture 60 may assume a variety of configurations fittingly compatible with selected component 14 structures attachable thereat. A setscrew 62 threadably engages lower socket 50b and bears against the surface of component 14 portion 14a as placed within mount aperture 60. Component 14 thereby finds secure attachment, i.e., support, relative to socket 50.

Component 14 can be placed within one of sockets 50a and 50b before joining together sockets 50a and 50b in such cases where the length of component 14 as a whole requires such placement. In other words, where the length of component 14 as a whole extends fully between a pair collars 20 as mounted to separate posts 10 and must be moved vertically into place.

Socket 50 may be secured at a fixed location relative to collar 20 before final positioning of collar 20. The width, i.e., horizontal dimension, of slotted apertures 34 determines the degree of rotational freedom allowed collar 20 subsequent to boring screws 32 into apertures 36. This rotational freedom should be sufficient to allow rotational movement of collar 20 to such extent that discrete positioning of socket 50 relative to collar 20 does not limit a selected analog radial orientation for component 14 relative to post 10. In other words, the dovetail pattern of cut-outs 40 and teeth 42 require discrete positioning of socket 50 relative to collar 20, however, such discrete positioning of socket 50 relative to collar 20 does not limit component 14 to discrete positions relative to post 10 because of the rotational freedom of movement afforded collar 20 relative to post 10.

Apertures 34, however, need not be slotted apertures. Cylindrical apertures may be used and any desired radial position for components relative to post 10 extending therefrom may be achieved by careful positioning of collar 20 before its final attachment to post 10.

Thus, component 14 finds secure attachment to post 10 at any selected height and at any radial orientation thereabout.

While not illustrated in FIG. 1, a plurality of sockets 50 and, therefore, a plurality of components 14, attach to a given collar 20 at a common selected vertical position on post 10. Thus, a plurality of components 14 mount at a common height in outward extending orientation relative to a post 10 by mounting a plurality of sockets 50 upon a given collar 20 and for each socket 50 by attaching a component 14 thereto.

Figure 2:
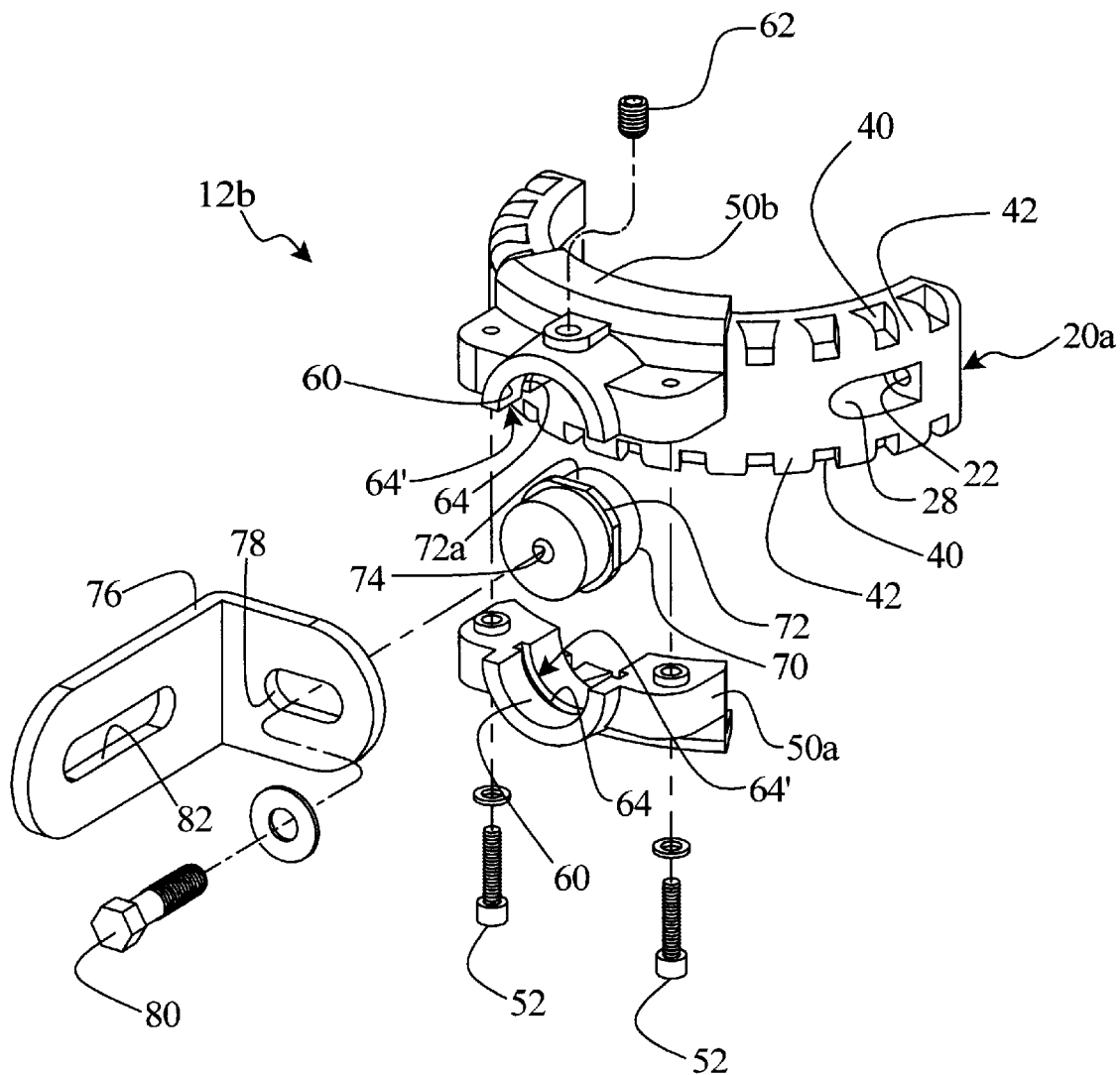
FIG. 2 illustrates a collar-clamp and mounting insert with bracket assembly also for securing a playground structural component to a vertical post.

FIG. 2 illustrates collar-clamp and bracket assembly 12b as an alternative arrangement for securing a component to a post 10. Assembly 12b includes collar 20 and socket 50 as described above. For purposes of illustration, however, only collar half 20a is illustrated in FIG. 2. It will be understood, however, that assembly 12b attaches to a post 10 at selected vertical and radial position as described above for assembly 12a.

In FIG. 2, a collar half, e.g. collar half 20a, is illustrated including its presentation of cut-outs 40 and teeth 42 about its upper and lower periphery. In this particular configuration, socket 50 is flipped in vertical orientation, i.e., lower socket 50b rests on the upper periphery of collar half 20a as described above, i.e., with its teeth 42 engaging the cut-outs 40 of collar 20a and the teeth 42 of collar 20a engaging the cut-outs 40 of lower socket 50b. Similarly, upper socket 50a is shown in position directly below lower socket 50b ready for vertical upward movement thereof and similar engagement with collar half 20a.

Upper socket 50a and lower socket 50b each include within the hemi-cylindrical portion of aperture 60 a hemi-annular groove 64. When sockets 50a and 50b join to form the cylindrical mounting aperture 60, hemi-annular grooves 64 join to form an annular groove about the inner surface of component mount aperture 60. A mounting insert 70 includes a generally cylindrical plug structure with an annular ridge 72 thereabout. Mounting insert 70 occupies component mount aperture 60 with ridge 72 resting within the annular groove 64' formed by hemi-annular grooves 64 of sockets 50a and 50b. Thus, with bolts 52 securing together sockets 50a and 50b, mounting insert 70 securely attaches relative to collar half 20a. As may be appreciated, because collar half 20a may be securely attached to a given post 10 as described above, mounting insert 70 attaches at a given height and radial orientation relative to a post 10. Furthermore, a plurality of sockets 50, and therefore inserts 70, attach to a given collar 20.

Mounting insert 70 includes a threaded aperture 74. Threaded aperture 74, therefore, mounts at a selected height and radial orientation relative to a given post 10. A component bracket 76 including a slotted aperture 78 abuts mounting insert 70 and a bracket bolt 80 passes through slotted aperture 78 and into threaded aperture 74 to mount bracket 76 relative to mounting insert 70. Bracket 76 includes a second slotted aperture 82 presented at a given vertical position and radial orientation relative to a post 10 for attachment of other structural elements thereto. As may be appreciated, a variety of structural components attaches to bracket 76 at the slotted aperture 82. Furthermore, by virtue of the horizontal slotted configuration of aperture 78, bracket 76 mounts in a variety of positions relative to mounting insert 70 thereby positioning bracket 76 in a broad variety of locations relative to post 10.

A setscrew 62 threadably engages lower socket 50b and bears against ridge 72 of insert 70. Ridge 72 may be provided with flats 72a. Flats 72a present to set screw 62 a surface normal thereto for better engagement by setscrew 62. Set screw 62 need not, however, engage ridge 72 in normal orientation relative to flats 72a.

Figure 3:
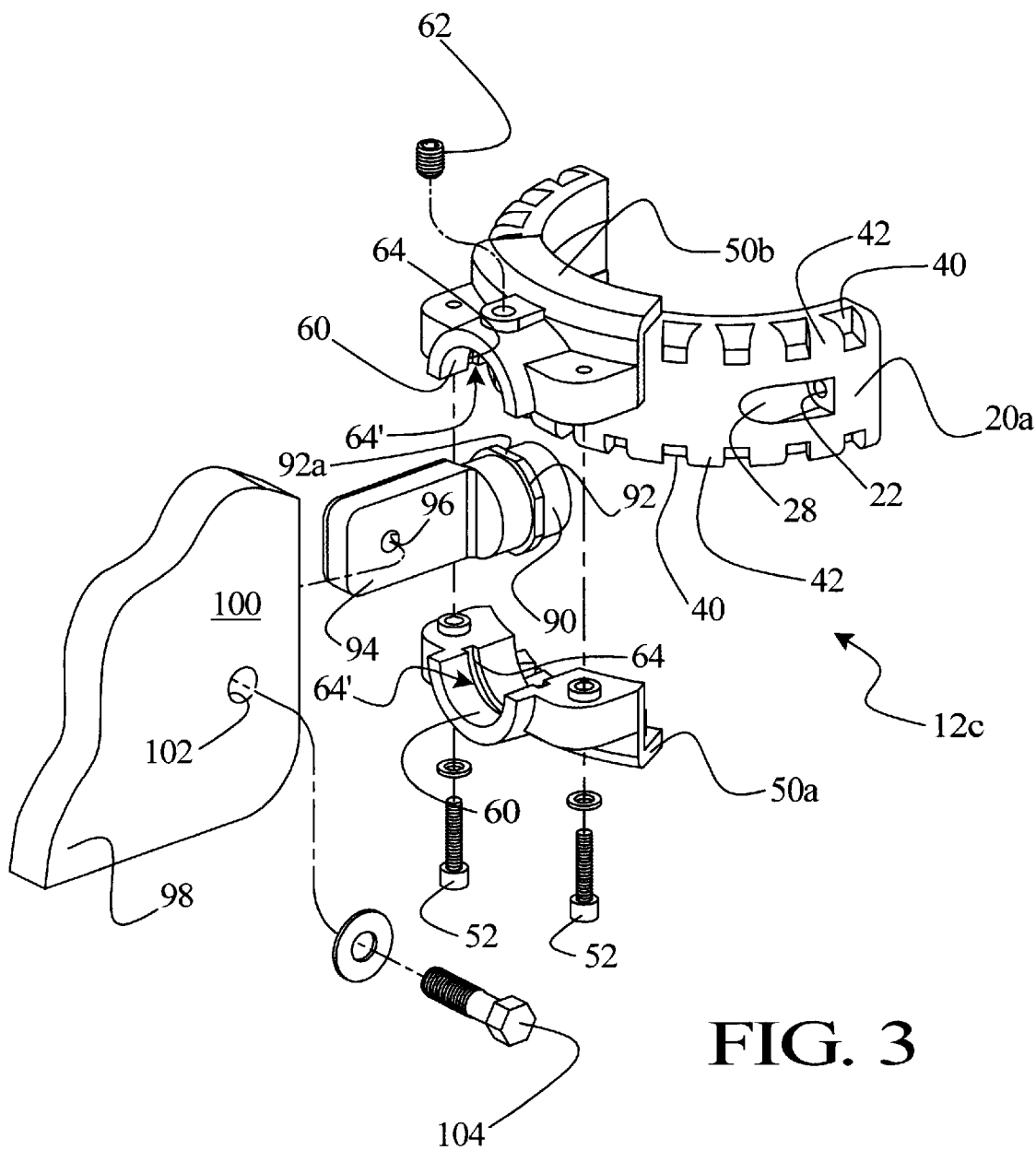
FIG. 3 illustrates a collar-clamp and mounting lug also for securing a playground structural component to a vertical post.

FIG. 3 illustrates a collar-clamp and lug assembly 12c as an alternative arrangement for securing a component to a post 10. Assembly 12c includes collar 20 and socket 50 as described above. For purposes of illustration, however, only collar half 20a is illustrated in FIG. 3. It will be understood, however, that assembly 12c attaches to a post 10 at selected vertical and radial position as described above for assembly 12.

In FIG. 3, illustrates collar half 20a with lower socket 50b positioned at its upper periphery and upper socket 50a in position for vertical upward movement to engage collar 20a. A mounting lug 90 is generally similar to mounting insert 70 in its relationship to socket 50. In other words, mounting lug 90 includes a generally cylindrical portion resting within the component mount aperture 60 of socket 50 and includes an annular ridge 92 including flats 92a resting within the annular groove 64' of socket assembly 50. Socket bolts 52 capture together upper socket 50a and lower socket 50b to capture therebetween lug 90. Set screw 62 threadably engages socket 50b and bears against lug 90 whereby lug 90 finds secure attachment within assembly 50 and therefore relative to collar half 20a.

Mounting lug 90 presents a protrusion 94 extending from socket 50 and including an aperture 96. Thus, protrusion 94 mounts at a given vertical height and selected radial orientation relative to a given post 10. Furthermore, lug 90 mounts at any given rotational location within mounting aperture 60 whereby aperture 96 of protrusion 94 may be oriented through 360 degrees about the axis of aperture 60. Component 98 includes a surface 100 receiving protrusion 94 and including an aperture 102 aligning with aperture 96 of protrusion 94. In this manner, a component mounting bolt 104 passes through apertures 102 and 96 to attach component 98 securely to lug 90. Thus, component 98 may be mounted at a given height, radial position about, and orientation relative to a given post 10.

Figure 4:
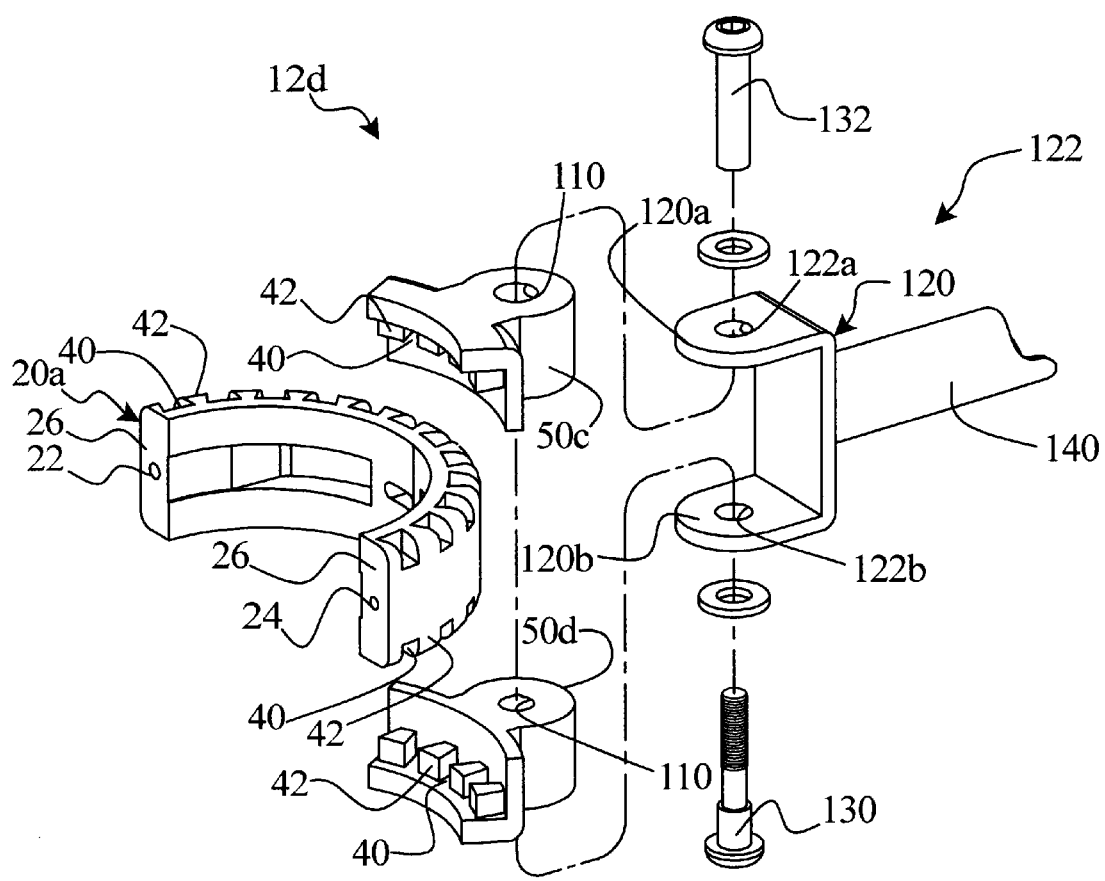
FIG. 4 illustrates a collar-clamp and mounting blocks with clevis assembly also for securing a playground structural component to a vertical post.

FIG. 4 illustrates a collar-clamp and clevis assembly 12d as an alternative arrangement for securing a component to a post 10. Assembly 12d includes collar 20 as described above. For purposes of illustration, however, only collar half 20a is illustrated in FIG. 4. It will be understood, however, that assembly 12d attaches by means of a collar 20 to a post 10 at selected vertical and radial position as described above for assembly 12a.

In FIG. 4, collar half 20a includes at its upper and lower periphery the series of cut-outs 40 and teeth 42 as described above. Socket 50, however, is replaced by an upper mounting block 50c and lower mounting block 50d. Mounting blocks 50c and 50d each include a series of cut-outs 40 and teeth 42 corresponding in shape and pattern for inter-fitting engagement with the teeth 42 and cut-outs 40 of collar half 20a. Thus, by positioning each of mounting blocks 50c and 50d in a selected discrete position relative to collar half 20a and moving blocks 50c and 50d vertically together, blocks 50c and 50d securely capture therebetween collar half 20a. Each of blocks 50c and 50d include a vertically disposed open aperture 110. Apertures 110 align when blocks 50c and 50d mount at a selected discrete position upon the collar half 20a.

A clevis 120 maintains block 50c and block 50d together and, therefore, maintains coupling of block 50c and block 50d relative to collar half 20a. Clevis 120 includes an upper ear 120a and a lower ear 120b. Each of ears 120a and 120b include a vertically disposed aperture 122, individually, 122a and 122b. Ear 120a and ear 120b are vertically spaced at an appropriate distance to tightly engage the upper surface and lower surface of block 50c and block 50d, respectively. In this manner, ears 120 prevent vertical relative displacement of block 50c and block 50d. Thus, clevis 120 captures block 50c and block 50d against relative vertical displacement and thereby maintains mounting engagement of block 50c and block 50d relative to collar half 20a. Apertures 122 of clevis 120 align with apertures 110 of block 50c and block 50d. A shoulder bolt 130 and barrel nut 132 pass through apertures 122 and 110 and engage one another. In this manner, clevis 120 rotatably attaches to the assembly of block 50c, block 50d, and collar half 20a. Extending outward from clevis 120, a component 140 attaches at a selected height and radial orientation relative to a given post 10.

Figure 5:
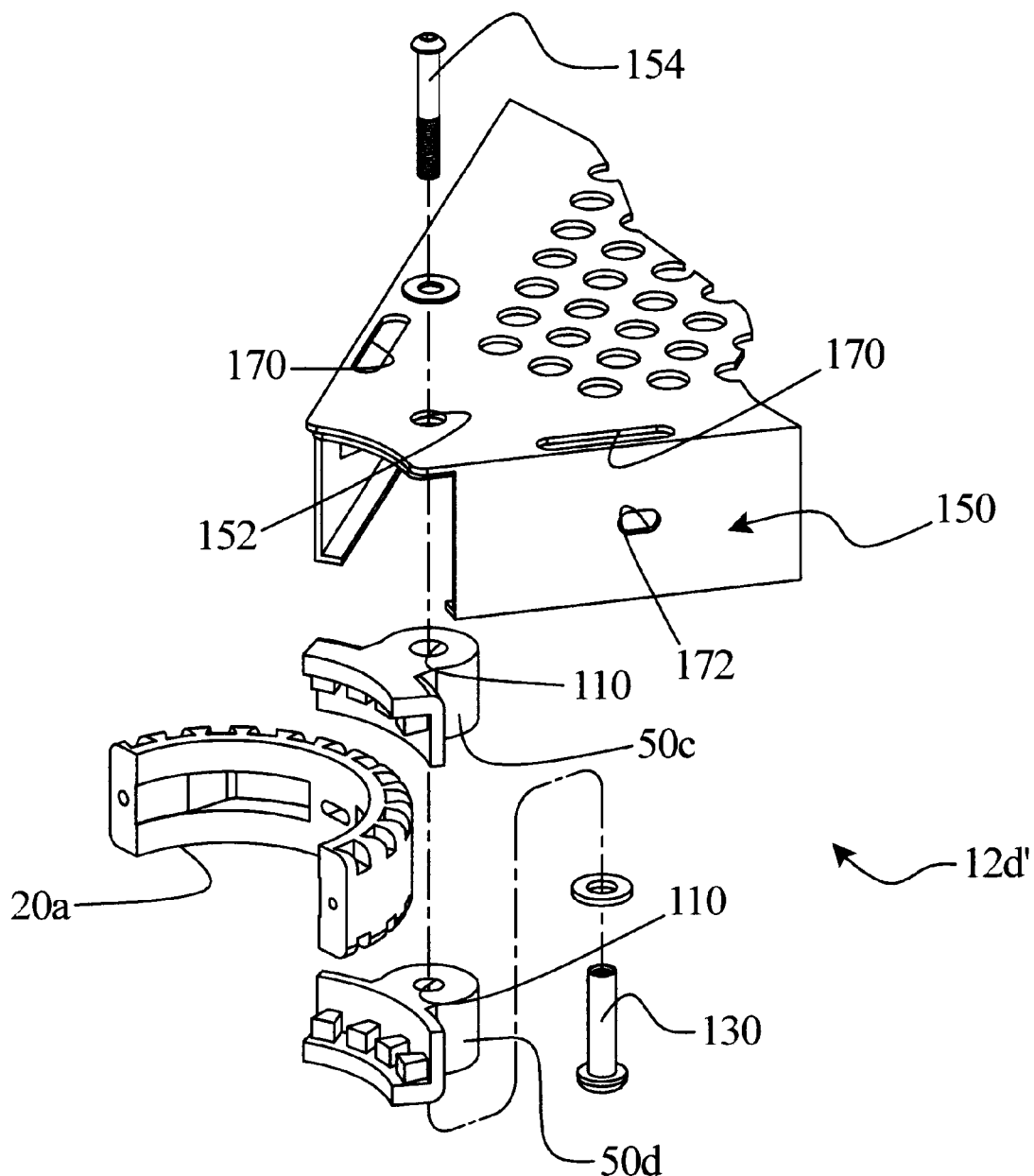
FIG. 5 illustrates a collar-clamp and mounting blocks for securing a playground deck component to a vertical post.

FIG. 5 illustrates use of the arrangement of FIG. 4 absent clevis 120 as assembly 12d' to secure a deck 150 relative to a post 10 (not shown in FIG. 5). In FIG. 5, collar half 20a receives mounting blocks 50c and 50d as described above, i.e., inter-fitting engagement between cut-outs 40 and teeth 42 thereof. With blocks 50c and 50d secured at a selected discrete position relative to collar half 20a, and with collar half 20a coupled together with the complimentary collar half 20b to form an annular structure about a given post 10 (not shown in FIG. 5), upper block 50c is positioned at the upper periphery of collar half 20a by inter-fitting complimentary engagement of cut-outs 40 and teeth 42 relative to teeth 42 and cut-outs 40 of collar half 20a. Deck 150 includes an aperture 152 positioned for alignment relative to aperture 110 of blocks 50c and 50d. With deck 150 so positioned for alignment upon block 50c, block 50d may be positioned below block 50c. Bolt 154 then passes from above through aperture 152, aperture 110 in block 50c, aperture 110 in block 50d and engages a barrel nut 130 inserted from below through such apertures.

Thus, the combination of bolt 154 and barrel nut 130 captures together blocks 50c and 50d and thereby secures blocks 50c and 50d to collar half 20a while simultaneously securing deck 150 to the assembly. Thus, deck 150 may be positioned at a selected vertical height and radial orientation relative to a given post 10.

Figure 6:
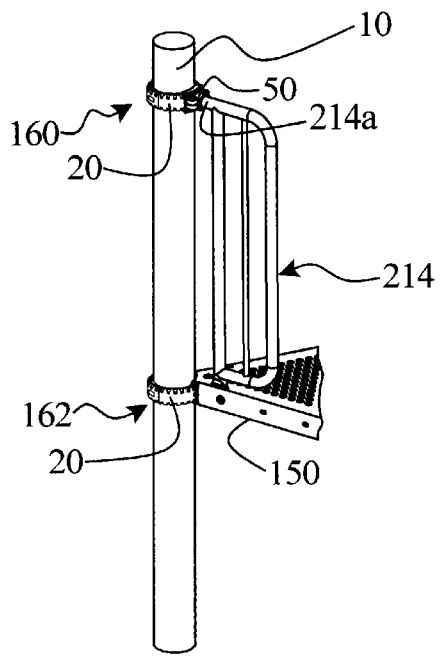
FIGS. 6 and 7 illustrate a vertical post including an upper clamp assembly and lower clamp assembly together supporting a wall component and deck component.
Figure 7:
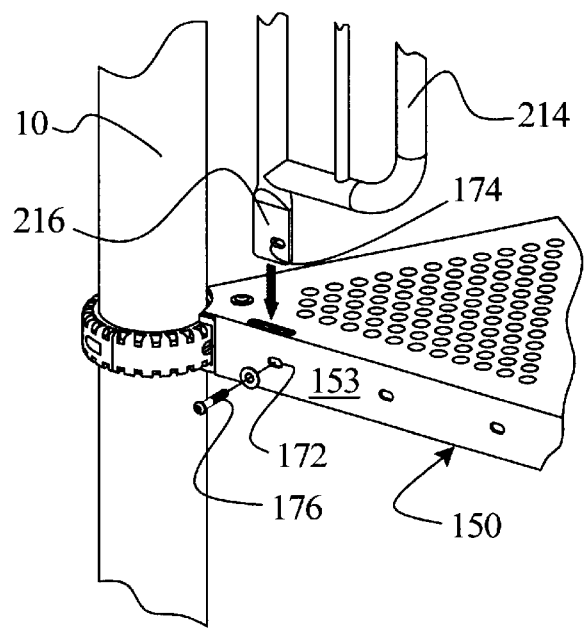

FIGS. 6 and 7 illustrate a vertical post 10 including an upper clamp 160 and a lower clamp 162 together supporting a wall component 214 and deck 150. FIG. 6 illustrates the wall 214 and deck 150 as coupled to a post 10 for use and FIG. 7 shows the assembly during installation as described below.

Each of clamps 160 and 162 includes an annular clamp 20 as described above, i.e., the combination of collar half 20a and collar half 20b joined together to form clamp 20 capturing post 10 therebetween. Upper clamp 160 includes a socket 50 capturing therein and securing thereat a component 214. More particularly, component 214 is a railing or wall structure including a protruding cylindrical portion 214a received within the component mounting aperture 60 of socket 50.

Lower clamp 162 also includes an annular clamp 20 as described above, but employs the upper and lower mounting blocks 50c and 50d, respectively, as illustrated in FIG. 5 to secure deck 150 thereat.

Deck 150 includes a slot 170 along its upward-facing surface. In the side-facing surface 153 of deck 150, an aperture 172 presents a slotted generally horizontal orientation. Component 214 includes a downward-projecting dagger or protrusion 216 passing vertically downward through slot 170 of deck 150 (FIG. 7) and including a slotted aperture 174 positioned for alignment with aperture 172 of deck 150. A deck bolt 176 passes through apertures 172 and 174 to secure the lower portion of component 214 relative to deck 150. In this manner, component 214 mounts securely at its upper portion relative to an assembly 12a and, importantly, at its lower portion relative to a deck 150. More particularly, certain components attach by surface-flush mounting to the outward facing surface 153 of deck 150. For example, panels 904 in FIG. 9 attach to a deck 150 and require a clear unobstructed flush abutment to surface 150. Other examples of components requiring a flush and unobstructed surface for mounting include slides, climbers and stairs. In prior art systems, outward-facing deck surfaces such as surface 153 could be used for only one component, e.g. a wall component such as wall 214 or one of the walls 904, a stair component, a climber component, or a slide component. It was typically not possibly to attach two components to a single deck surface 153. As illustrated in FIGS. 6 and 7, however, the present invention provides a hidden and unobstructed attachment point to a deck, e.g. for one component such as wall 214, which does not interfere with attachment of other components requiring a flush outward-facing surface contact such as walls 904, stairs, climbers, and slides.

Figure 8:
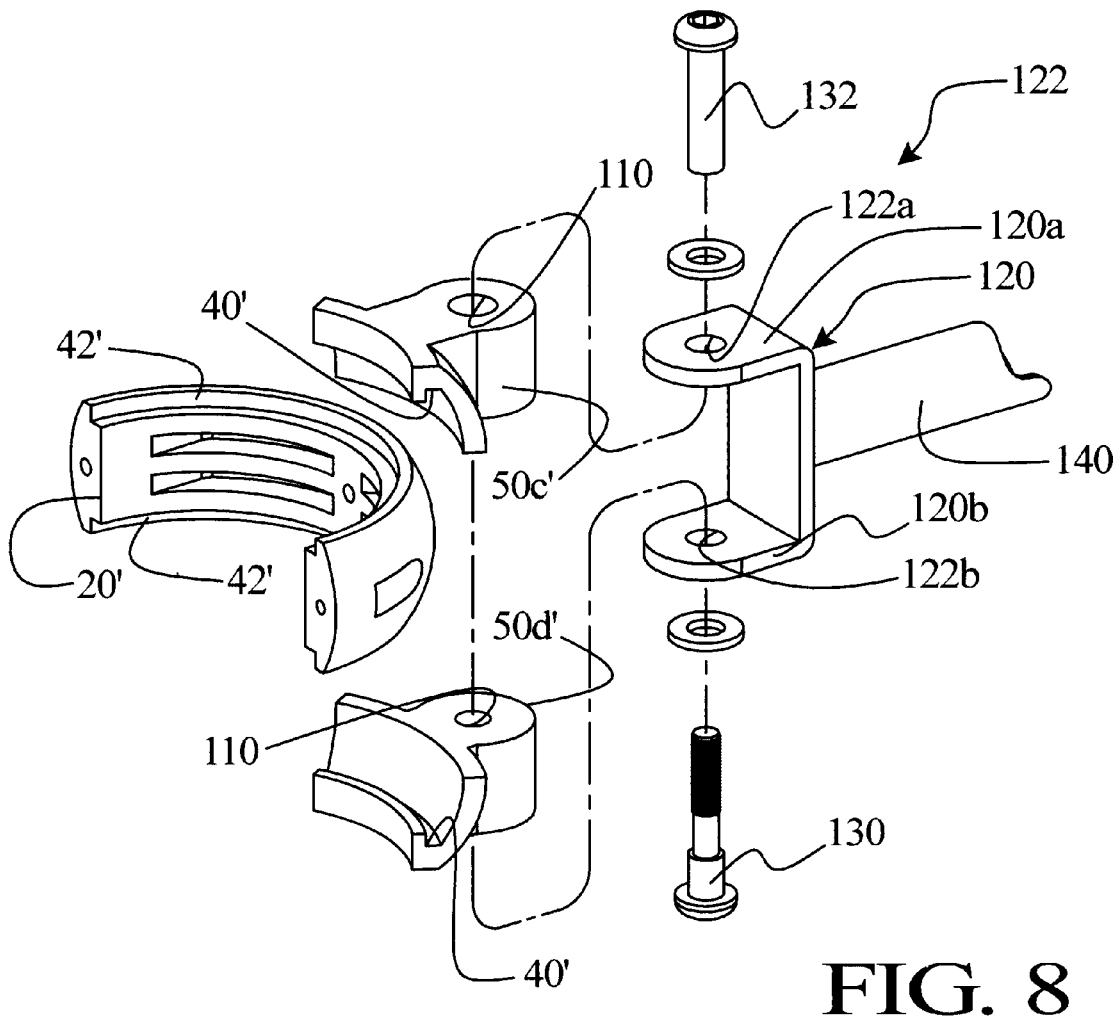
FIG. 8 illustrates a slidable-type collar clamp in combination with a clevis under one embodiment of the present invention.

FIG. 8 illustrates an alternative mounting arrangement contemplated under the present invention. In FIG. 8, a half collar 20' is similar to the previously described collar halves 20a and 20b in that two such half collars 20' together form an annular structure surrounding a post 10. Half collar 20' differs, however, in its analog positioning capability for mounting block 50c' and block 50d' relative to the annular collar structure. In FIG. 8, half collar 20' includes about its upper periphery a hemi-annular upper ridge 42'. A similar hemi-annular ridge 42' lies along the lower periphery of half collar 20'. Thus, as joined together, a pair of half collars 20' present upper and lower annular ridges about the resulting annular clamp structure. Each of mounting block 50c' and block 50d' include a semi-annular groove 40'.

With block 50c' and block 50d' brought vertically together with semi-annular ridge 42' engaging groove 40' of block 50c' and with semi-annular groove 40' of block 50d' engaging the lower ridge 42', clevis 120 captures at its upper ear 120a and lower ear 120b blocks 50c' and 50d' therebetween. This maintains the assembly of blocks 50c' and 50d' against vertical displacement and, therefore, in slidable relationship relative to a half collar 20'. Half collar 20' combines with a second half collar 20' (not shown) when mounted about a post 10. This allows a slidable positioning function for blocks 50c' and 50d' about the combined annular structure. The shoulder bolt 130 and barrel nut 132 passing through apertures 122 and 110 maintain clevis 120 on blocks 50c' and 50d' in a rotatable condition. Component 140 extends radially outward from clevis 120 and may be positioned at a given vertical height and radial orientation relative to a given post 10.

With respect to the mounting arrangement of FIGS. 4 and 8, component 140 may be secured at any selected height corresponding to the height of mounting for the corresponding collar, e.g., joined collars 20a and 20b in the case of FIG. 4 and a pair of collars 20' in the case of FIG. 8. Furthermore, component 140 may be positioned at a selected radial orientation by virtue of the selected rotatability of collar assembly 20 relative to post 10 in the case of FIG. 4 and the slidable relationship between blocks 50c' and 50d' in the case of the arrangement of FIG. 8. Furthermore, in each of the arrangements of FIG. 4 and FIG. 8, component 140 enjoys a further freedom of movement in positioning capability by virtue of the rotatable relationship between clevis 120 and mounting blocks 50c and 50d in the case of FIG. 4 and mounting blocks 50c' and 50d' in the case of FIG. 8.

Thus, blocks 50c and 50d (and blocks 50c' and 50d') are positionable at a selected radial orientation relative to post 10 and when so positioned present a mount site, e.g., apertures 110, selectably positionable through a range of radial positions about post 10. The important feature of this mount site is that it presents constant surface orientation throughout its range of positions about post 10. In other words, a mount site presenting constant apparent geometric surface features which "look" the same to a component-supporting element, e.g. clevis 120, throughout the range of positions for blocks 50c and 50d (and blocks 50c; and 50d'). Clevis 120 thereby serves as a component-supporting element mountable to this mount site when presented in its constant surface orientation throughout it range of positions about post 10.

Consider, for example, a situation where inaccurate, unintentional or necessary placement of a pair of posts 10 would otherwise not leave appropriate room therebetween for a component 140 of fixed length. Traditionally, playground structure clamping arrangements lacked sufficient adaptability to handle such a situation, especially when unexpected during field assembly. The arrangement as shown in either FIG. 4 or FIG. 8, however, introduces significant adaptability during installation even when post 10 placement is unexpectedly found improper. More particularly, clevis 120 accommodates a wider range of radial positions for annular clamps relative to the corresponding posts 10 and thereby introduces a corresponding adaptability in range of separation between a clevis 120 on one post 10 and a clevis 120 on a second post 10. In other words, the apertures 122 of a first clevis 120 mounted relative to a first post 10 need not be in fixed spaced relation relative to the apertures 122 of a second clevis 120 mounted relative to a second post 10. This in turn allows flexibility when accommodating placement of a component of fixed length between a pair of posts 10 of fixed separation, especially when such fixed separation does not match exactly the length of the intervening component.

Figure 9:
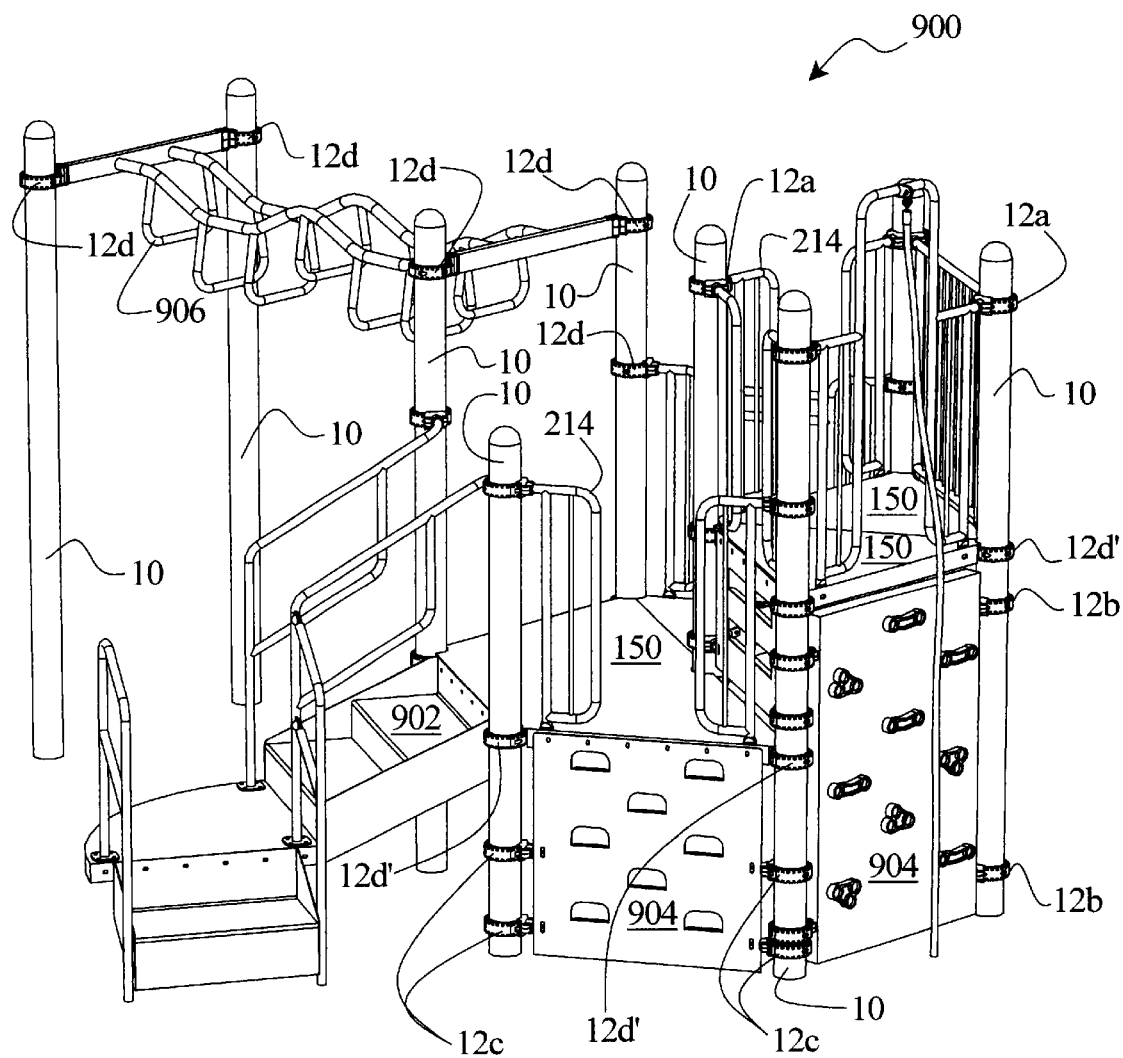
FIG. 9 illustrates a playground structure system making use of the assemblies of FIGS. 1–7.

FIG. 9 illustrates a playground system 900 including a plurality of vertically disposed posts 10 supporting, by way of selected ones of assemblies 12a–12d and 12d', a variety of structure components including decks 150, walls 214, stairs 902, walls 904, and horizontal ladders 906.

Figure 10:
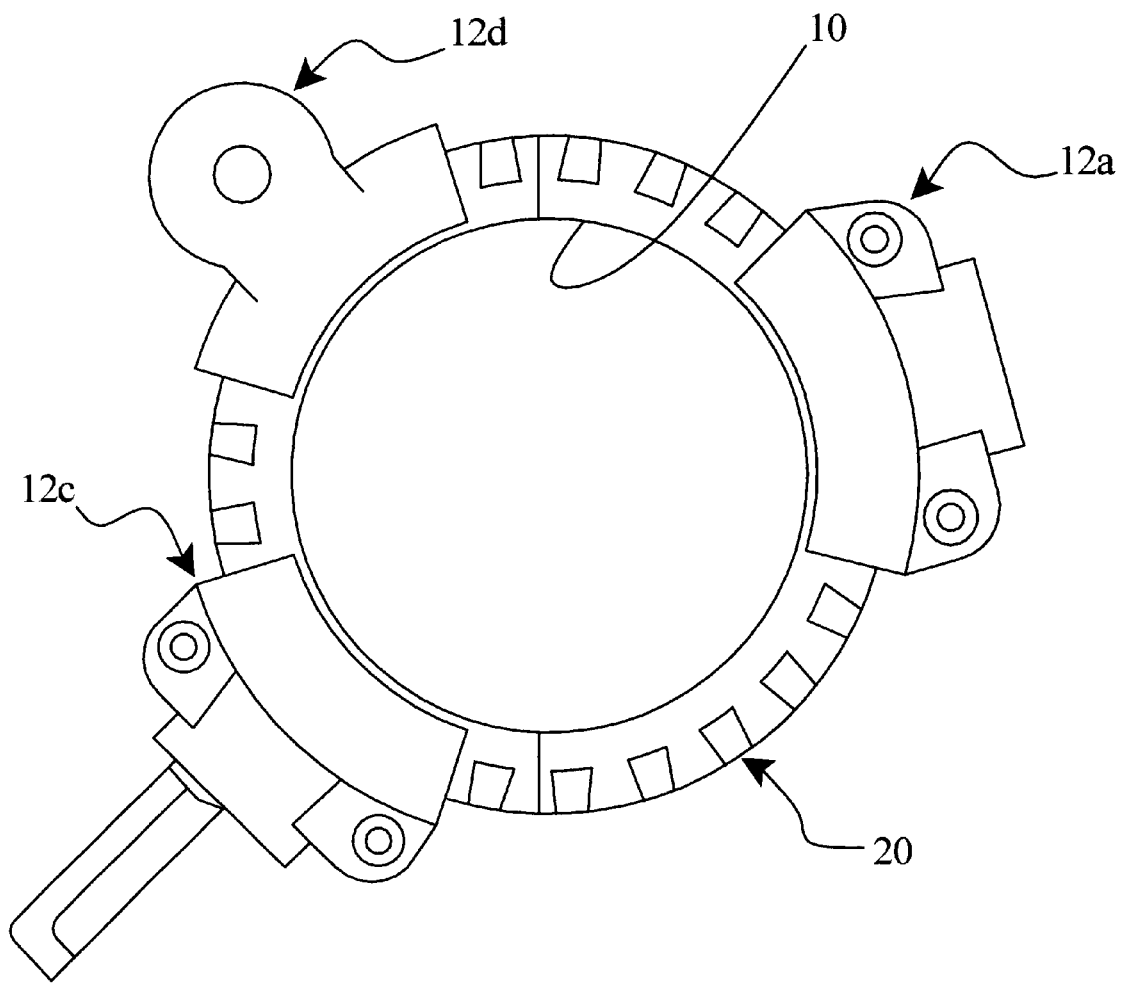
FIG. 10 illustrates attachment of multiple component mounting assemblies at a common height on a single collar-clamp.

FIG. 10 illustrates a post 10 as viewed from above and a collar-clamp 20 attached thereto. A plurality of assemblies 12a–12d and 12d' attach to a single collar-clamp 20 at a common vertical height. This is particularly advantageous when constructing playground systems where several structures desirably attach to a single post 10 at a common vertical position. In the particular embodiment illustrated herein, up to six assemblies 12a–12d and 12d' may attach to a single collar-clamp 20. As may be appreciated, other configurations under the present invention may provide greater of fewer maximum number of assemblies 12a–12d and 12d' on a given collar-clamp 20 by variation in dimension. Also in the illustrated embodiment, the dovetail pattern, presenting 24 cutouts 42 and presenting 24 teeth 40, establishes discrete mounting sites for assemblies 12a–12d and 12d' upon a collar-clamp 20 at 15 degree increments. This allows an advantageous placement scheme including radial orientation relative offsets for assemblies 12a–12d at 15 degree increments about a collar-clamp 20. This supports the common 0, 30, 45, 60, 90, 120, 150, 180, 210, 240, 270, 300, 330, and 360 degree radial orientations used in playground structure construction schemes. A variety of additional configurations and construction schemes are possible by use of the 15 degree offset capability noted above. As noted above, the radial orientation for an assembly 12a–12d and 12d' relative to a post 10 is not limited to discrete radial positions.

The dovetail coupling between collar-clamp 20 and either of socket 50a–50b or block 50c–50d offers a number of additional advantageous relative to prior slidable-type coupling arrangements as shown in the prior art.

Collar-clamp 20 as manufactured by die-casting with the dovetail coupling structure has an increased socket 50a–50b or mounting block 50c–50d surface contact area of approximately 40% over the slidable-type collar clamp as illustrated in FIG. 8 and in U.S. Pat. Nos. 5,785,447 and 5,575,580. Furthermore, the majority of the strength of a die-cast part comes from the surface or "skin" and, therefore, the strength of collar-clamp 20 as illustrated herein and as manufactured by die-casting should be approximately 40% greater than the slidable-type collar-clamp. The same strength considerations are believed true for the sockets 50a–50b and for mounting blocks 50c and 50d. Thus, when coupled together, collar-clamp 20 and sockets/blocks 50a–50d offer significant increase in strength and resistance to deformation, detachment, or loosening.

Sockets 50a–50b and blocks 50c–50d are self-aligning relative to collar-claim 20 and allow easy assembly because the parts cannot shift or "walk about" the collar 20 during the assembly process.

When fully assembled, the present invention places the attaching component load closer to the higher strength, i.e., higher load capacity, centerline of the collar.

Under the present invention, opposing top and bottom dovetail patterns allow the weight carrying capacity distribution through the top and bottom sockets 50a–50b or through top and bottom blocks 50c–50d. In contrast, slidable-type annular clamps are believed to support the full weight of the attached component on a single upper lip or ridge and corresponding channel.

Furthermore, slidable-type collar-clamp arrangements introduce a "wedge effect" at the convex collar face urging apart the bifurcated a socket/receiver attached thereto. Collar-clamp 20 has no such "wedge effect" relative to sockets 50a–50b or blocks 50c–50d.

The dovetail pattern as proposed under the present invention creates additional strength from a web formed gusset extending from the upper horizontal lip to the inner vertical face.

Under the present invention, no residual strain is required to hold the sockets 50a–50b or mounting blocks 50c–50d in place when fully assembled. In other words, the slidable-type clamping arrangements require the clamping force or strain between the upper and lower sockets elements to both hold together the socket components and to lock the bifurcated socket against sliding about the collar-clamp. Under the present invention, however, clamping force between the sockets 50a and 50b or between the blocks 50c and 50d need only be sufficient to hold together the bifurcated socket 50a–50b or bifurcated block 50c–50d. No additional forces are needed to resist sliding because the dovetail engagement with the collar-clamp 20 inherently prevents such sliding.

Finally, the dovetail clamping arrangements of the present invention are believed to have greater resistance to stress from uneven settling or shifting ground.

It will be appreciated that the present invention is not restricted to the particular embodiment that has been described and illustrated, and that variations may be made therein without departing from the scope of the invention as found in the appended claims and equivalents thereof. For example, while a dovetail pattern has been shown other mounting arrangements, including but not limited to gear-type geometries and dagger-type geometries, may be used to better engage and to more widely distribute load forces relative to the circular geometry of the slidable-type collar-clamp of the prior art.

What is claimed is:

1. In combination, a structural component;

a cylindrical post;

an annular clamp concentric to and engaging said post at a selected position therealong and at selected radial orientation thereabout, said annular clamp including a first contact surface; and a component coupling member attached to said component, said component coupling member presenting a second contact surface, said second contact surface being matingly compatible to inter-fit said first contact surface and establish a finite number of relative positions between said annular clamp and said component coupling member, said second contact surface engaging said first contact surface to transfer from said second contact surface to said first contact surface a load force originating from said component.

2. A combination according to claim 1 wherein said post is vertically disposed.

3. A combination according to claim 1 wherein said first and second contact surfaces are discontinuous surfaces.

4. A combination according to claim 1 wherein said first and second contact surfaces comprise a first and a second, respectively, set of planar surfaces.

5. A combination according to claim 4 wherein each of said first and second set of planar surfaces define a dovetail pattern.

6. A combination according to claim 1 wherein said second contact surface follows a semi-annular path similar to said annular path of said first contact surface.

7. A combination according to claim 1 wherein said annular clamp is a bifurcated collar-clamp, each half thereof being C-shaped.

8. In combination, a structural component;

a cylindrical post;

an annular clamp concentric to and engaging said post at a selected position therealong and at selected radial orientation thereabout, said annular clamp including a first contact surface, said first contact surface being non-concentric relative to said post and following an annular path concentric to post; and a component coupling member attached to said component, said component coupling member presenting a second contact surface, said second contact surface being matingly compatible to inter-fit said first contact surface, said second contact surface engaging said first contact surface to transfer from said second contact surface to said first contact surface a load force originating from said component, said component coupling member being bifurcated.

9. A combination according to claim 1 wherein said annular clamp further includes a third contact surface, said third contact surface being non-concentric relative to said post and following a second annular path concentric to said post.

10. In combination, a structural component;

a cylindrical post;

an annular clamp concentric to and engaging said post at a selected position therealong and at selected radial orientation thereabout, said annular clamp including a first contact surface, said first contact surface being non-concentric relative to said post and following an annular path concentric to said post, said annular clamp further including a third contact surface, said third contact surface being non-concentric relative to said post and following a second annular path concentric to said post; and a component coupling member attached to said component, said component coupling member presenting a second contact surface, said second contact surface being matingly compatible to inter-fit said first contact surface, said second contact surface engaging said first contact surface to transfer from said second contact surface to said first contact surface a load force originating from said component, said component coupling member including a fourth contact surface, said fourth contact surface being matingly compatible to inter-fit said third contact surface, said fourth contact surface engaging said third contact surface to transfer from said fourth contact surface to said third contact surface a load force originating from said component.

11. A combination according to claim 10 wherein said third and fourth contact surfaces each are discontinuous surfaces.

12. A combination according to claim 10 wherein said third and fourth contact surfaces comprise a third and a fourth, respectively, set of planar surfaces.

13. A combination according to claim 12 wherein each of said third and fourth set of planar surfaces define a dovetail pattern.

14. A combination according to claim 10 wherein said third contact surface follows a second semi-annular path similar to said second annular path of said first contact surface.

15. A combination according to claim 1 wherein said combination further comprises a plurality of said components, a plurality of said posts, a plurality of said annular clamps, and a plurality of said component coupling members organized a structure wherein said posts support said annular clamps and wherein each of said components span at least two of said posts coupled at each end thereto by way of one of said component coupling members.

16. In a structure including components, vertical posts, annular clamps coupled to the posts, and component coupling members mounted selectably about the periphery of said clamps whereby said components attach to the coupling members and span said posts, and an improved component coupling member comprising:

a block positionable at a selected radial orientation relative to said post, said block including when so positioned a mount site, said mount site being thereby selectably positionable through a range of radial positions about said post, said mount site having a constant surface orientation throughout said range of positions; and a component supporting element mountable to said mount site when presented in said constant surface orientation, said component supporting element carrying a load force originating from said component, said mount site comprising a vertically disposed aperture.

17. An improvement according to claim 16 wherein said block is slidably positionable relative to said clamp.

18. In combination, a structural component;

a cylindrical post;

an annular clamp concentric to and engaging said post at a selected position therealong and at selected radial orientation thereabout, said annular clamp including a first contact surface; and a component coupling member attached to said component, said component coupling member presenting a second contact surface, said second contact surface being matingly compatible to inter-lock with said first contact surface and to block relative rotation between said clamp and said component coupling member, said second contact surface engaging said first contact surface to transfer from said second contact surface to said first contact surface a load force originating from said component.

19. In combination, a structural component;

a cylindrical post;

an annular clamp concentric to and engaging said post at a selected position therealong and at selected radial orientation thereabout, said annular clamp including a first contact surface, said first contact surface being discontinuous; and a component coupling member attached to said component, said component coupling member presenting a second contact surface, said second contact surface being discontinuous and matingly compatible with said first contact surface, said second contact surface engaging said first contact surface to transfer from said second contact surface to said first contact surface a load force originating from said component.

20. In combination, a structural component;

a cylindrical post;

an annular clamp concentric to and engaging said post at a selected position therealong and at selected radial orientation thereabout, said annular clamp including a first contact surface, said first contact surface defining a first dovetail pattern; and a component coupling member attached to said component, said component coupling member presenting a second contact surface, said second contact surface defining a second dovetail pattern matingly compatible with said first dovetail pattern, said second contact surface engaging said first contact surface to transfer from said second contact surface to said first contact surface a load force originating from said component.

* * * * *